US008763160B2

(12) United States Patent
Melin et al.

(10) Patent No.: US 8,763,160 B2
(45) Date of Patent: Jun. 24, 2014

(54) MEASUREMENT OF THE SURFACE POTENTIAL OF A MATERIAL

(75) Inventors: Thierry Melin, Lille (FR); Didier Theron, Roubaix (FR); Sophie Barbet, Villeneuve D'ascq (FR); Dominique Deresmes, Louvil (FR); Heinrich Diesinger, Lesquin (FR)

(73) Assignees: Centre National de la Recherche Scientifique—CNRS, Paris (FR); Universite des Sciences et Technologies de Lille, Villeneuve D'ascq (FR)

( * ) Notice: Subject to any disclaimer, the term of this patent is extended or adjusted under 35 U.S.C. 154(b) by 0 days.

(21) Appl. No.: 13/576,381

(22) PCT Filed: Feb. 9, 2011

(86) PCT No.: PCT/FR2011/050267
§ 371 (c)(1),
(2), (4) Date: Jul. 31, 2012

(87) PCT Pub. No.: WO2011/098720
PCT Pub. Date: Aug. 18, 2011

(65) Prior Publication Data
US 2012/0304342 A1 Nov. 29, 2012

(30) Foreign Application Priority Data
Feb. 15, 2010 (FR) .................................. 10 00624

(51) Int. Cl.
*G01Q 10/06* (2010.01)
*G01Q 60/02* (2010.01)
*G01Q 60/24* (2010.01)
*G01Q 60/34* (2010.01)

(52) U.S. Cl.
CPC ................ *G01Q 10/06* (2013.01); *G01Q 60/02* (2013.01); *G01Q 60/24* (2013.01); *G01Q 60/34* (2013.01)
USPC ...................... 850/4; 850/22; 850/38; 850/54

(58) Field of Classification Search
USPC ........................................................ 850/21
See application file for complete search history.

(56) References Cited

U.S. PATENT DOCUMENTS 5,412,980 A * 5/1995 Elings et al. .................... 73/105
5,418,363 A   5/1995 Elings et al.
(Continued)

FOREIGN PATENT DOCUMENTS

JP          06308180 A * 11/1994

OTHER PUBLICATIONS

Barbet, S., "Kelvin force microscopy on gallium nitride materials and devices," Universite Lille1—Sciences et Technologies, 2 pages (abstract only), Mar. 3, 2008.
(Continued)

*Primary Examiner* — Jack Berman
*Assistant Examiner* — James Choi
(74) *Attorney, Agent, or Firm* — Seed IP Law Group PLLC

(57) ABSTRACT

During a measurement in KFM mode of the surface potential of a material (P), a detection point (1) is arranged above a surface (S) of the material. Two piezoelectric actuators (2, 5) are used to monitor a mean distance of the detection point relative to the surface of the material and a mechanical oscillation of said point. During the measurement, a control voltage is applied between control electrodes (2a, 2b) of the piezoelectric actuator (2) which is dedicated to the mechanical oscillation of the detection point (1), said control voltage not having an alternative component to an angular frequency of electrical energization of said detection point. A result of the KFM measurement is therefore separate from operating parameters such as a projection angle used to perform closed-loop control and a value of the angular frequency of electrical energization. The invention thus provides absolute measurements of surface potentials.

11 Claims, 3 Drawing Sheets

(56) References Cited

U.S. PATENT DOCUMENTS

| | | | |
|---|---|---|---|
| 5,883,705 A * | 3/1999 | Minne et al. | 355/71 |
| 6,005,246 A * | 12/1999 | Kitamura et al. | 850/21 |
| 2003/0034453 A1* | 2/2003 | Ookubo et al. | 250/306 |
| 2011/0231966 A1* | 9/2011 | Passian et al. | 850/21 |
| 2011/0271412 A1* | 11/2011 | Rychen | 850/21 |
| 2011/0283428 A1* | 11/2011 | Dazzi et al. | 850/33 |
| 2012/0131702 A1* | 5/2012 | Shi et al. | 850/1 |
| 2012/0216322 A1* | 8/2012 | Bocek et al. | 850/33 |
| 2012/0304343 A1* | 11/2012 | Moon | 850/33 |

OTHER PUBLICATIONS

Diesinger, H. et al., "Kelvin force microscopy at the second cantilever resonance: An out-of-vacuum crosstalk compensation setup," Ultramicroscopy 108:773-781, 2008.

Veeco Metrology Group, "NanoScope IVa Controller Manual," Software Version 6.13, Part Nos. 004-118-000 (standard), 004-118-100 (cleanroom), 2004.

* cited by examiner

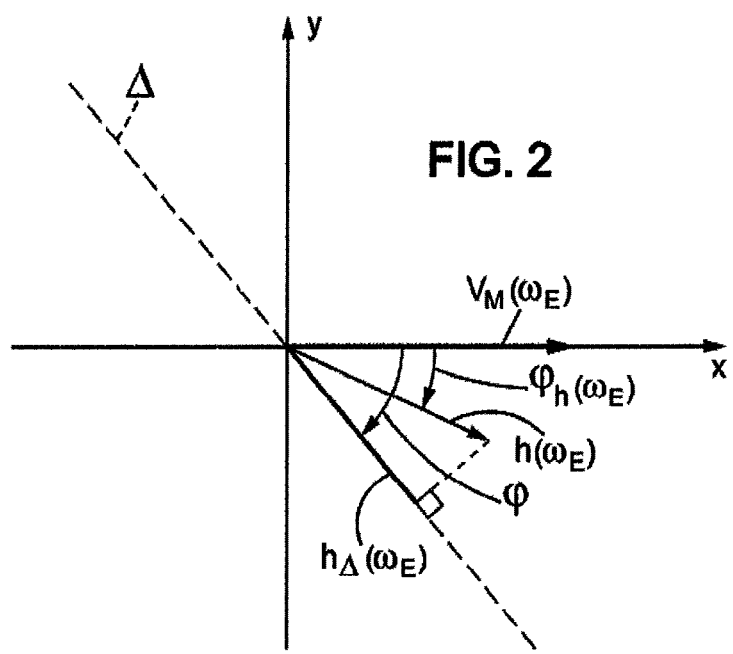

MEASUREMENT OF THE SURFACE POTENTIAL OF A MATERIAL

The invention relates to a method for measuring the surface potential of a material. It also relates to a device for implementing such a method.

Numerous methods are used to characterize a surface of a material, particularly a semiconductor material.

Among these methods, atomic force microscopy or AFM produces a characterization of the topography of the surface of the material. In other words, it maps the heights of the hills and valleys present in the surface of the material. To this end, an atomic force microscope comprises a detection tip which is brought into contact with the surface of the material to be analyzed. Contact is understood to mean a distance between the detection tip and the surface to be analyzed which is typically less than 10 nm (nanometers). A first piezoelectric actuator allows adjusting the average height of the detection tip above the surface of the material. The detection tip is mounted on one end of a flexible cantilever, the other end being attached to a second piezoelectric actuator, also called a bimorph actuator. One method of capturing the topography of the surface of the material consists of applying an alternating voltage between two control electrodes of the second piezoelectric actuator and recording variations in the deflection of the cantilever in contact with the surface while the detection tip is moved across this surface. During the measurement, the detection tip is therefore oscillated by the second piezoelectric actuator, by means of the cantilever, in a movement which has a component perpendicular to the surface of the material to be analyzed.

Another known characterization of the surface of a material consists of measuring the value of the potential of this surface at variable points, and then constructing a map of the surface potential. The surface potential is referred to as $V_S$ in the rest of this document. This other characterization is commonly known as KFM, for Kelvin Force Microscopy. It can also be carried out using an atomic force microscope, but keeping the detection tip at a distance from the surface of material, for example several tens of nanometers from this surface. The information which is captured during a KFM characterization concerns only the surface potential of the material, and not the topography of its surface. In general, the measured value of the surface potential can vary with the height of the tip above the surface of the material. During KFM characterization, a voltage $V_M$ is applied between the detection tip and the material being analyzed, which has a direct voltage component $V_M(0)$ and an alternating voltage component $V_M(\omega_E)$. An electrostatic force is thus produced between the detection tip and material being analyzed. This force possesses a component $F(\omega_E, t)$ at the angular frequency $\omega_E$ of the alternating voltage component, called the angular frequency of excitation. According to theory, the force component $F(\omega_E, t)$ is given by the following formula.

$$F(\omega_E, t) = (dC/dh) \times (V_M(0) - V_S) \times V_M(\omega_E) \cos(\omega_E \cdot t)$$

where C is the capacitance of the capacitor formed by the detection tip and the surface of the material, h is the separation between the detection tip and the surface of the material, cos indicates the cosine trigonometric function, and t is the time variable. Thus the value of the direct component $V_M(0)$ for which the deformation of the cantilever has a zero spectral component at the angular frequency of excitation $\omega_E$, constitutes a measurement of the surface potential $V_S$.

Another mode exists for characterizing the surface of the material, in which AFM and KFM characterizations are conducted simultaneously. In this combined mode, the detection tip of the atomic force microscope is placed in contact with the surface to be studied, to capture its topography as is done in AFM characterization. The piezoelectric actuator again applies a mechanical oscillation movement to the cantilever supporting the detection tip, substantially perpendicular to the surface to be analyzed. An alternating voltage is applied at the same time between the detection tip and the portion of material to be analyzed. The respective frequencies of the mechanical oscillation and the alternating voltage are different. The variations in the height of the detection tip are then analyzed simultaneously at the two frequencies, so that this combined method simultaneously provides both a map of the hills and valleys of the surface and a map of its surface potential $V_S$. In other words, these two maps are determined from a single scan of the surface of the material by the detection tip. However, the values of the surface potential of the material which are obtained in this manner are mean values relative to the variations in height of the detection tip above the surface of the material. In addition, because of its principle, this combined mode does not easily allow measuring variations in the surface potential as a function of the mean distance separating the detection tip from the surface of material being analyzed.

For these reasons, the use of an atomic force microscope in KFM mode is the most appropriate for characterizing the surface potential of a material. In this mode, the detection tip is maintained at a constant height above the surface to be studied, because the direct component of the voltage applied between the detection tip and the material is adjusted to cancel out the amplitude of the tip's oscillations.

In order to obtain greater accuracy in measuring the surface potential $V_S$ in KFM mode, the angular frequency of excitation $\omega_E$ is usually selected within a spectral range of cantilever resonance so that it is close to the natural oscillation frequency of the cantilever deflection. In fact, an optimum response of the cantilever to excitation by the alternating component of the voltage $V_M$ is obtained under these conditions. Even so, this alternating component of the voltage applied at the detection tip is only an operative amount which is used for the measurement. Therefore, in principle the value of the surface potential $V_S$ of the analyzed material is independent of the angular frequency of excitation $\omega_E$. In practice, however, the result of measuring the surface potential in KFM mode varies by several hundred millivolts when the angular frequency of excitation used is modified. Such a variation in the measurement result prevents experimentally obtaining an absolute value for the surface potential, particularly for a semiconductor material for which the band gap is about 1 V (volt). Only variations in the surface potential can then be measured, with a need to conduct a strict calibration of the measurements. The procedure for this calibration is particularly long and tedious.

In KFM mode, it is also necessary to use a projection angle, also called "drive phase" to control the value of the direct component $V_M(0)$ of the voltage applied between the detection tip and the material, to reduce the height variations of the detection tip for the excitation frequency. This drive phase is an operating parameter for the measurement system. As a result, the value of the surface potential is also independent of the value of this drive phase, in principle. The result of a measurement of the surface potential in KFM mode also varies by several hundred millivolts in practice, according to the value chosen for this drive phase.

Under these conditions, a first object of the invention is to provide a measurement of the surface potential of a material, for which the result is independent of operating parameters such as the angular frequency of excitation of a detection tip used for the measurement, or the drive phase used to control the value of the direct component of a measurement voltage.

A second object of the invention is to provide a measurement of the surface potential of a semiconductor material, with an interval of accuracy which is much smaller than the width of the band gap for this material.

A third object of the invention is to enable measuring the surface potential of a material, with no calibration of the measurements being necessary, or any necessary calibration being fast and easy to implement.

A fourth object of the invention is to enable measuring the surface potential of a material using a measurement device which is commercially available, and in particular such a device acquired before the present invention.

To achieve these and other objects, the invention proposes a method for measuring a surface potential of a portion of material, wherein an electrically conductive detection tip is placed above a surface of this portion of material. A first piezoelectric actuator is arranged to control a mean distance of the detection tip above the surface of the portion of material. A second piezoelectric actuator is additionally arranged to control a mechanical oscillation of the detection tip above the surface of the portion of material as a function of a voltage which exists between two control electrodes of this second piezoelectric actuator. The method comprises the following steps:

applying a measurement voltage between the detection tip and the portion of material, this measurement voltage comprising a direct component and an alternating component having a selected angular frequency of excitation;

simultaneously detecting variations in the instant height of the detection tip;

measuring the amplitude of a component of the variations in the instant height of the detection tip at the angular frequency of excitation; and adjusting a value of the direct component of the measurement voltage in a manner that reduces or cancels the amplitude of the component of the variations in the instant height of the detection tip for the angular frequency of excitation, the adjusted value of the direct component of the measurement voltage constituting a result of the measurement of the surface potential of the portion of material.

The method of the invention is characterized in that, while the variations in the instant height of the detection tip are being detected:

the two control electrodes of the second piezoelectric actuator are electrically connected to two respective reference terminals; and a control voltage is applied between these two control electrodes of the second piezoelectric actuator, by means of these two reference terminals, this control voltage having a zero amplitude alternating component for the angular frequency of excitation.

A method according to the invention is therefore consistent with the KFM mode for characterizing the portion of material. It provides a measurement of the surface potential of this portion. In the invention, the KFM mode of characterization is supplemented to control the voltage that is present between the control electrodes of the second piezoelectric actuator, so that this voltage does not have a spectral component at the angular frequency of excitation. Such closed-loop control of the voltage between the control electrodes of the second piezoelectric actuator ensures that this actuator does not transmit movement to the detection tip, which would contribute to the variations in the instant height of this tip at the angular frequency of excitation. Thus any crosstalk that might exist between a source of the alternating component of the measurement voltage and the piezoelectric actuator would not interfere with the adjustment of the direct component of the measurement voltage. Such crosstalk would therefore not alter the results of the surface potential measurement.

In an improvement of the invention, a contribution to an electrical signal for detecting the component of the variations in the instant height of the detection tip for the angular frequency of excitation, may additionally be compensated for while these variations in the instant height are being detected, this contribution resulting from a direct coupling between the measurement voltage applied between the detection tip and the portion of material, and detection means used to detect the variations in the instant height of the detection tip.

This other coupling is called a direct coupling because it occurs between the electrical excitation of the detection tip in KFM mode and the system for detecting variations in the instant height of this tip. Because of its compensation according to the improvement of the invention, it no longer impacts the adjustment of the direct component of the measurement voltage to reduce or cancel the amplitude of the component of the variations in instant height of the detection tip for the angular frequency of excitation. It therefore does not affect the result of the surface potential measurement which is thus obtained.

It is possible for the improvement of the invention to additionally comprise prior measurements of the contribution of the direct coupling to an electrical signal for detecting the variations in the instant height of the detection tip, for angular frequencies which are different from the angular frequency of excitation. The contribution of the direct coupling can then be compensated for by extrapolation, at the angular frequency of excitation, of results from these prior measurements.

When this direct coupling between the electrical excitation of the detection tip in KFM mode and the means for detecting variations in the height of this tip does not exist, or when it is present but is compensated for according to the above improvement of the invention, the result of the surface potential measurement is independent of the angular frequency of excitation used for the measurement. The result of the measurement is also independent of the drive phase used to adjust the direct component of the measurement voltage as a function of the alternating component, at the angular frequency of excitation, of the variations in instant height of the detection tip. In other words, the invention provides an absolute measurement of the surface potential of the portion of material.

The interval of accuracy of the result of the surface potential measurement may be estimated by varying the angular frequency of excitation in KFM mode, or by varying the drive phase used to adjust the direct component of the measurement voltage. By applying the invention, the inventors have obtained a width of 10 to 30 mV (millivolts) for this interval of accuracy. For example, when the material of the analyzed portion is semiconducting, such an interval is much smaller than the width of the band gap value for the material. The latter may be on the order of 1 eV (electron-volt). In other words, the invention allows accurately measuring the Fermi level of a semiconductor material.

In addition, the invention eliminates the calibration procedure(s) performed on samples of reference materials to calibrate the tool used to measure the surface potential. Only a determination of the direct coupling, between the electrical excitation of the detection tip in KFM mode and the means for detecting the variations in the instant height of this tip, is necessary for the improvement of the invention. This prior step is short and easy to implement.

Lastly, a method of the invention may be carried out using an atomic force microscope. In particular, a model of such a microscope which was available before the invention can be used, by connecting the control electrodes of the second piezoelectric actuator according to the invention while measurements are being conducted in KFM mode.

In a particularly simple implementation of the invention, the control voltage may be constantly zero while the variations in the instant height of the detection tip are being detected. In other words, the two control electrodes of the piezoelectric actuator are electrically connected to each other during a measurement in KFM mode.

The invention also proposes a device for measuring the surface potential, which is adapted to implement a method of the invention. Such a device is adapted to apply, between the control electrodes of the second piezoelectric actuators, while conducting a measurement in KFM characterization mode, a control voltage which has a zero amplitude alternating component for the angular frequency of excitation.

To this purpose, a connection means can comprise a switching assembly which is adapted to electrically connect the control electrodes of the second piezoelectric actuator to the two reference terminals when a measurement voltage generator is activated, and to electrically isolate these control electrodes relative to the reference terminals when a topographical characterization mode is selected for the device. Such a switching assembly may be internal to an atomic force microscope used to measure the surface potential, or may be part of a module external to the atomic force microscope. This latter possibility allows the use of the invention with a previously acquired atomic force microscope, by adding the module to the microscope.

Other features and advantages of the invention will become apparent in the following description of an example of a non-limiting embodiment, with reference to the attached drawings in which:

FIG. 2 is a diagram illustrating the parameters of a closed-loop control system applied in a mode implemented by the invention.

Figure 1:
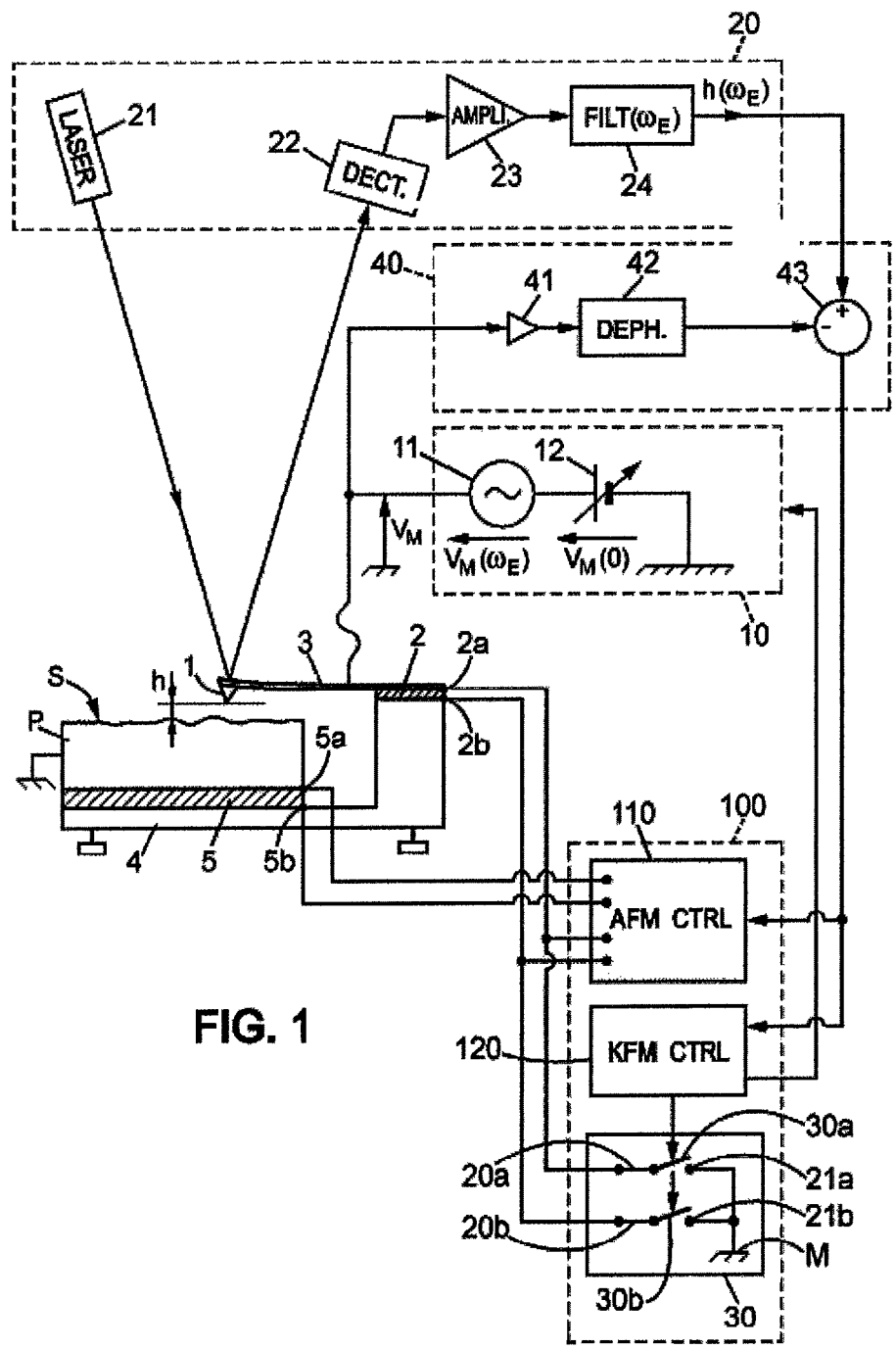
FIG. 1 is a block diagram showing the main components of a device for measuring surface potential according to the invention.

In FIG. 1, a device for measuring the surface potential of a portion P of a material comprises:
- a detection tip 1, which is electrically conductive and intended to be arranged above a surface S of the portion P;
- a first piezoelectric actuator, or bimorph actuator, which is labeled 5 and is arranged to control a mean distance between the detection tip 1 and the surface S of the portion P;
- a second piezoelectric actuator 2, or piezoelectric bimorph, which is equipped with two control electrodes 2a and 2b, and which is adapted to control a mechanical oscillation of the detection tip 1 above the surface S as a function of a voltage existing between the two control electrodes 2a and 2b;
- an electrical generator 10, which is adapted to apply a measurement voltage $V_M$ between the detection tip 1 and the portion of material P, this measurement voltage $V_M$ comprising a direct component $V_M(0)$ and an alternating component $V_M(\omega_E)$ having an angular frequency of excitation $\omega_E$;
- detection means 20, which are adapted to detect variations in an instant height h of the detection tip 1;
- measurement means, which are adapted to measure an amplitude of a component $h(\omega_E)$ of the variations in instant height h of the detection tip 1, for the angular frequency of excitation $\omega_E$;
- regulating means, which are adapted to adjust a value of the direct component $V_M(0)$ of the measurement voltage $V_M$ in a manner that reduces or cancels the amplitude of the component $h(\omega_E)$ of the variations in instant height of the detection tip 1 for the angular frequency of excitation $\omega_E$, the adjusted value of this direct component $V_M(0)$ constituting a result of the measurement of the surface potential $V_S$ of the portion of material P; and
- a control unit of the device, which is labeled 100.

Such a mechanical device may comprise an atomic force microscope. In one possible configuration of the device, the piezoelectric actuator 5 may be arranged between the portion P of the material to be analyzed and a support 4 for the device. The piezoelectric actuator 2 may then be arranged between the support 4 and a flexible cantilever 3 which mechanically supports the detection tip 1. The cantilever 3 supports the detection tip 1 at one end, while its other end is rigidly connected to the actuator 2. The actuator 2 therefore allows moving the detection tip 1 in a direction which is substantially perpendicular to the surface S of the portion of material P, by means of the cantilever 3. Usually, this displacement of the detection tip 1 by the actuator 2 is angled approximately 10-15° relative to the direction perpendicular to the surface S of the portion P.

The generator 10 comprises a source of alternating voltage 11, which may be of variable frequency, and a source of direct voltage 12 which is variable. The sources 11 and 12 are connected so that the generator 10 outputs a measurement voltage $V_M$ which comprises the sum of an alternating voltage component $V_M(\omega_E)$ and a direct voltage component $V_M(0)$.

The detection means 20 usually comprise a laser source 21 and a light detector 22 which are fixed. The source 21 and the detector 22 are arranged so that a beam of light produced by the source 21 is reflected towards the detector 22 by the end of the cantilever 3 supporting the detection tip 1, in a manner which varies with the instant height h of the tip 1. An electrical signal output from the detector 22 is connected to an amplifier 23, as well as to filtering means which filters the electrical signal 24.

In a known manner, in the mode of operation called AFM mode, a topographical characterization of the surface S can be obtained with such a device, based on the variations in instant height h of the detection tip 1 when this tip is moved parallel to the surface S. According to the principles of AFM mode, the detection tip 1 is brought into contact with the surface S and reproduces the height variations of the surface S. In fact, the piezoelectric actuator 2 applies mechanical excitation to the tip 1, by means of the cantilever 3, and the variations in instant height h are detected at the frequency of this mechanical excitation. The control unit 100 comprises a module for controlling the operation in AFM mode, which is labeled 110 in FIG. 1 and denoted AFM CTRL, for AFM controller. This AFM controller 110 is connected to the control electrodes 5a and 5b of the piezoelectric actuator 5, and to those 2a and 2b of the piezoelectric actuator 2. But this operation in AFM mode is not the object of the invention, and is not illustrated by FIG. 1.

In a fairly well-known manner, the mode of operation referred to as KFM mode allows using the same atomic force microscope to measure the surface potential $V_S$ of the portion of material P. This KFM mode is distinct from the above AFM mode, and is illustrated in FIG. 1. In particular, the detection tip 1 is positioned at a mean distance from the surface S, which is selected by the operator, to obtain a measurement of the surface potential for this mean distance, and the generator 10 is used to apply electrical excitation to the detection tip 1. In KFM mode, the piezoelectric actuator 2 is not used. As a result, the KFM mode as considered in the present patent application is not a combined mode for simultaneously characterizing the topography and the surface potential of the portion P.

As was summarized in the first portion of this description, the generator 10 in KFM mode applies the measurement voltage $V_M$ between the detection tip 1 and the portion P of the material to be analyzed. The voltage $V_M$ causes an oscillation of the detection tip 1, which is detected by the detection means 20. The electrical signal which is produced by the light detector 22, then amplified by the amplifier 23, is then transmitted to the filter 24. The filter 24 selects the component of the electrical detection signal which has an angular frequency identical to the angular frequency of excitation $\omega_E$. For this reason, the filter 24 is denoted FILT($\omega_E$) in FIG. 1. The filter 24 then sends a filtered detection signal to a module which controls the operations in KFM mode, labeled 120 and denoted KFM CTRL for KFM controller. This filtered detection signal is representative of the component of the variations in instant height h of the detection tip 1 at the angular frequency of excitation $\omega_E$. For brevity, the filtered detection signal is denoted h($\omega_E$) in FIG. 1. The control modules 110 and 120 are functionally represented as being separate, but it is understood that in practice they may be a single module which has the two alternating modes of operation AFM and KFM.

The module 120 incorporates the measurement means which determine the component h($\omega_E$), at the angular frequency $\omega_E$, of the variations in the instant height h of the detection tip 1, from the filtered detection signal which is transmitted by the filter 24. It also incorporates the regulating means which adjust the value of the direct component $V_M(0)$ of the measurement voltage $V_M$, to reduce or cancel the component h($\omega_E$). This establishes a closed-loop control for adjusting the value of $V_M(0)$. When the component h($\omega_E$) is zero, or is at least minimal, the value of $V_M(0)$ constitutes a measurement of the surface potential $V_S$ of the portion of material P.

In a known manner, this closed-loop control uses an intermediate operating parameter which is called the drive phase and is denoted $\phi$. FIG. 2 represents, inside the complex plane, the alternating components at the angular frequency of excitation $\omega_E$ which are involved in KFM mode. The component $V_M(\omega_E)$ of the measurement voltage $V_M$ defines an origin for the phases corresponding to the x axis. The y axis, perpendicular to the x axis, corresponds to a quadrature phase shift. In steady state, the component h($\omega_E$) of the variations in instant height h presents an angular phase shift $\phi_h(\omega_E)$ relative to $V_M(\omega_E)$ which is constant. The drive phase $\phi$ is an angle which is also constant, between the component $V_M(\omega_E)$ and an axis of projection $\Delta$ which passes through the origin of the complex plane. In addition, the component h($\omega_E$) also forms a constant angle with the axis of projection $\Delta$, and the projection of h($\omega_E$) onto the axis $\Delta$, perpendicular to this axis, constitutes a signed parameter for the closed-loop control. This projection is denoted $h_A(\omega_E)$. "Signed parameter" is understood to mean an amount for which the sign can vary, in contrast to the amplitude of a spectral signal component, which is positive or zero. According to known theory for the KFM mode, the projection $h_A(\omega_E)$ is proportional to the signed difference between the direct component $V_M(0)$ and the surface potential $V_S$ of the portion P. Closed-loop control of the direct component $V_M(0)$ in order to cancel the projection $h_A(\omega_E)$ is easier to implement. However, the drive phase $\phi$ is only an intermediate parameter of such closed-loop control, and the value can be arbitrarily set by the operator. The value of the surface potential $V_S$ is therefore, in principal, independent of the value adopted for the drive phase $\phi$.

Similarly, in KFM mode, the value of the surface potential $V_S$ is, by its very nature, also independent of the value of the excitation frequency $\omega_E$. In practice, the angular frequency of excitation $\omega_E$ is chosen to be close to the resonance frequency of the cantilever 3, to increase the amplitude of h($\omega_E$). The precision of the closed-loop control is therefore better. Most often, the excitation frequency $\omega_E$ is selected within the interval 10 kHz (kilohertz)-500 kHz.

Figure 3A:
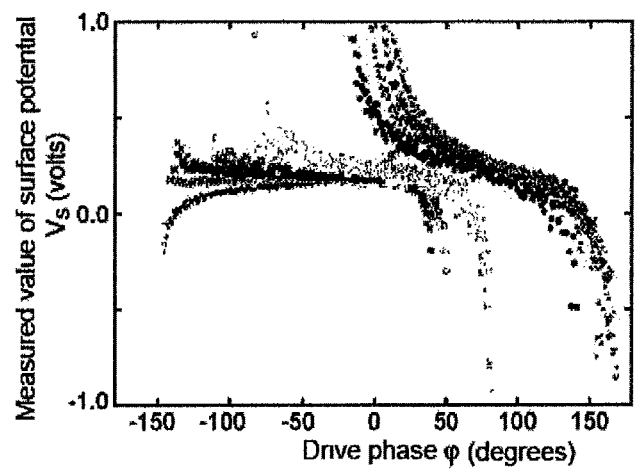
FIGS. 3a and 3b are diagrams respectively comparing results of surface potential measurements obtained prior to the invention and using the invention.

However, the inventors have observed that the results of the measurements of surface potential $V_S$ obtained with existing atomic force microscopes depend on the values selected for the drive phase $\phi$ and for the angular frequency of excitation $\omega_E$. FIG. 3a is a diagram which indicates the results of such measurements, for a portion P of platinum-iridium metal alloy, when different values are chosen for the drive phase $\phi$ (x axis in the diagram), and for different values for the angular frequency of excitation $\omega_E$ (symbols of different points in the diagram corresponding to different values of $\omega_E$). The variations in the measurement results shown in this diagram do not allow determining the surface potential $V_S$ to a precision of less than 0.3 V. It is therefore not possible to deduce the true value of the surface potential of the platinum-iridium alloy.

The invention provides a solution to this situation and allows obtaining, in KFM mode, a precise result for the measurement of the surface potential $V_S$.

To this end, the control unit 100 is adapted to control the connection means while the detection means 20 are activated, in a manner that electrically connects the control electrodes 2a and 2b of the piezoelectric actuator 2 to two respective reference terminals, and to simultaneously have a control voltage produced between these reference terminals. In addition, the control voltage has a zero amplitude alternating component for the angular frequency of excitation. Thus, in KFM mode, the piezoelectric actuator 2 produces no contribution to the movement of the detection tip 1, which would have a non-zero component for the angular frequency of excitation $\omega_E$. For example, the control voltage can be constantly zero while the detection means are activated.

In the particular implementation of the invention which is illustrated in FIG. 1, a switching module 30 is added to the atomic force microscope, comprising two switches 30a and 30b. A first connection 20a connects the control electrode 2a of the piezoelectric actuator 2 to an input terminal of the switch 30a. An output terminal 21a of the switch 30a is connected to the ground M of the device, so that the switch 30a electrically connects the control electrode 2a to the ground M when it is activated. Similarly, a second connection 20b connects the control electrode 2b of the piezoelectric actuator 2 to an input terminal of the switch 30b. An output terminal 21b of the switch 30b is also connected to the ground M. The switch 30b can thus electrically connect the electrode 2b to the ground M. The two switches 30a and 30b are simultaneously controlled by the control module 120. Thus, in KFM mode, the two electrodes 2a and 2b of the actuator 2 are at the same electrical potential, meaning zero potential. In AFM mode, the two switches 30a and 30b are open, so that the module 110 can control the operation of the device in the usual manner.

However, such a connection of the two control electrodes 2a and 2b to the ground M in KFM mode ensures a neutralization of the piezoelectric actuator 2 which is all the more effective when the electrical connections are short between the control electrodes 2a and 2b and the ground M. In other words, a terminal of the ground M is advantageously arranged as close as possible to the control electrodes 2a and 2b, to minimize the antenna effect or induction loop effect that the electrical connections between the control electrodes 2a, 2b and the ground M could produce. In general, a person skilled in the art will understand that the aim of the invention consists of the control voltage actually being present between the two control electrodes 2a and 2b, without parasitic voltage being added onto this control voltage and being captured by the connections for applying the control voltage. In the mode in FIG. 1, the connection module 30 is therefore advantageously as small as possible and arranged as close as possible to the actuator 2, with intermediate electrical connections which are short and can be superimposed or twisted together.

According to the inventors, connecting the control electrodes 2a and 2b to two reference terminals having a controlled voltage between them, this voltage possibly being zero as in the implementation illustrated in FIG. 1, eliminates the crosstalk that would be present between the generator 10 which is used in KFM mode and the piezoelectric actuator 2. In fact, because of such crosstalk, or indirect coupling, the piezoelectric actuator 2 produces a movement component of the detection tip 1 at the angular frequency of excitation $\omega_E$ which is combined with the component $h(\omega_E)$ resulting from the measurement voltage $V_M$. This indirect coupling depends on the angular frequency of excitation $\omega_E$. In addition, it is also the cause, at least partially, of the dependency of the results of the measurements of surface potential $V_S$ on the drive phase $\phi$. In addition, this same indirect coupling is responsible for a parasitic contribution to the variations in the results of the measurement of surface potential $V_S$ as a function of the height h of the detection tip 1. The invention therefore also allows eliminating such a parasitic contribution. It then allows performing a true study of the variation in the surface potential $V_S$ as a function of the distance away from the surface S of the portion P of material to be analyzed. In other words, the values of the surface potential can be measured at successive times during a relative displacement of the detection tip 1 relative to the surface S of the portion of material, perpendicularly to this surface, so as to measure variations in the surface potential of the portion P as a function of the mean distance between the detection tip 1 and the surface S.

Another coupling may occur, which also contributes to modifying in a variable manner the results of the measurements of surface potential $V_S$ as a function of the drive phase $\phi$ and of the frequency of excitation $\omega_E$, and to modifying the dependency of these measurement results on the distance of the detection tip 1 relative to the surface S. This other coupling occurs directly between the generator 10 which is used in KFM mode and the detection means 20. More specifically, it occurs between the source of alternating voltage 11 and the detector 22. For this reason, this other coupling is said to be direct.

This direct coupling may be compensated for in the filtered detection signal produced by the detection means 20, in order to avoid interfering with the adjustment of the direct component $V_M(0)$ of the measurement voltage in order to cancel the alternating component $h(\omega_E)$ of the variations in instant height of the detection tip 1. To this purpose, the device may additionally comprise compensation means, which are adapted to compensate for a contribution to the electrical detection signal for the component $h(\omega_E)$ of the variations in the instant height h of the detection tip 1, for the angular frequency of excitation $\omega_E$. The control unit 100 is additionally adapted to activate these compensation means while the detection means 20 are themselves activated. For example, such compensation means may be arranged in the form of a module 40 which has an input connected to the output of the generator 10. This module 40 may comprise a serially assembled attenuator or amplifier 41, phase converter 42, and subtractor 43. The subtractor 43 is placed between the output from the detection means 20 and the control module 120 for the operation in KFM mode, so that a reproduction of the component $V_M(\omega_E)$, attenuated or amplified and phase shifted, is subtracted from the filtered detection signal for the component $h(\omega_E)$.

In this case, the contribution of direct coupling to the electrical detection signal for the component $h(\omega_E)$ is determined prior to measuring the surface potential $V_S$. This contribution is measured for frequencies which are different from the value of the angular frequency of excitation $\omega_E$ chosen for conducting the KFM measurements. It is then extrapolated to this value $\omega_E$ chosen for the measurements. The amplitude and phase of the contribution of the direct coupling are thus determined for the measurement angular frequency of excitation $\omega_E$. Such an extrapolation avoids interference from the resonance of the cantilever 3 for the angular frequency of excitation $\omega_E$, on the measurement of the contribution of the direct coupling. For example, the angular frequency of excitation $\omega_E$ may be about 76 kHz (kilohertz) and the extrapolation may be obtained from an interval of between 50 kHz and 100 kHz. The attenuator 41 and the phase converter 42 are then adjusted to reproduce this direct coupling signal. The subtractor 43 then compensates for the contribution of the direct coupling in the filtered detection signal received by the module 120. An exact measurement of the surface potential $V_S$ using an atomic force microscope is thus possible in KFM mode.

Figure 3B:
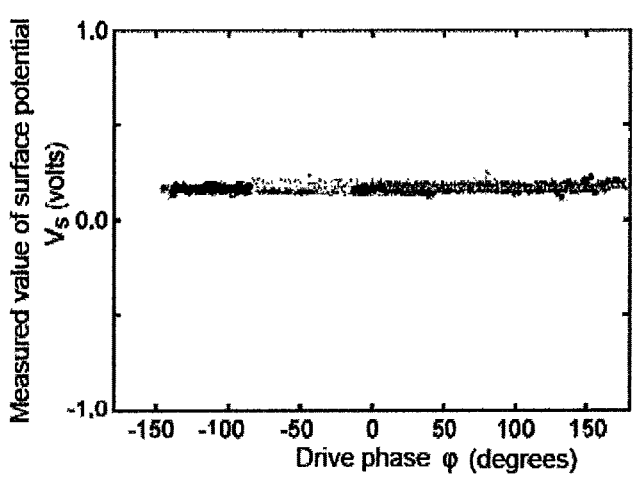

The diagram of FIG. 3b corresponds to that of FIG. 3a, with the switching module 30 and the compensation module 40 used in KFM mode in the manner just described. The value of the direct component $V_M(0)$ which cancels the alternating component $h(\omega_E)$ is then independent of the drive phase $\phi$ and of the angular frequency of excitation $\omega_E$. It constitutes an absolute measurement of the surface potential $V_S$ of the portion of material P. In practice, the variations in the results of the measurements of surface potential $V_S$, when the drive phase $\phi$ and the angular frequency of excitation $\omega_E$ are varied as indicated in the diagrams in FIGS. 3a and 3b, are on the order of or are less than several tens of millivolts. A microvolt level of precision can also be obtained in the measurements when sufficiently long integration periods are used.

Lastly, in a method for measuring the surface potential according to the invention, values of the surface potential $V_S$ may be measured at successive times during a relative displacement of the detection tip 1 parallel to the surface S of the material. A map of the surface potential $V_S$ of the portion of material P can thus be obtained which indicates the measured values of $V_S$ as a function of the coordinates of the tip's movement on the surface S.

It is understood that the invention may be applied by introducing numerous modifications to the detailed description provided above. These modifications include but are not limited to:

detection means 20, for detecting the variations in the instant height h of the detection tip 1, which may be of a different technology known to a person skilled in the art, in particular of a non-optical nature. For example, the cantilever 3 may be replaced by a prong of a tuning fork which is excited by a piezoelectric actuator, and for which the instant deformation is detected by electrodes also of piezoelectric material; and instead of compensating for direct coupling by adding a compensation signal in real time to the component $h(\omega_E)$ of the filtered electrical detection signal, it is possible to determine the amplitude and phase shift of the contribution of the direct coupling, and to combine them using software with the amplitude and phase of the component $h(\omega_E)$ to obtain an analog compensation in the steady state.

The invention claimed is:

1. A method for measuring a surface potential of a portion of material, wherein an electrically conductive detection tip is placed above a surface of said portion of material, with a first piezoelectric actuator arranged to control a mean distance of the detection tip above said surface of the portion of material, and a second piezoelectric actuator arranged to control a mechanical oscillation of said detection tip above said surface of the portion of material as a function of a voltage existing between two control electrodes of said second piezoelectric actuator, said method comprising the following steps:

applying a measurement voltage between the detection tip and the portion of material, said measurement voltage comprising a direct component and an alternating component having a selected angular frequency of excitation;

detecting variations in an instant height of the detection tip while applying the measurement voltage;

measuring an amplitude of a component of said variations in the instant height of the detection tip, for said angular frequency of excitation;

adjusting a value of the direct component of the measurement voltage in a manner that reduces or cancels the amplitude of the component of the variations in the instant height of the detection tip for the angular frequency of excitation, the adjusted value of said direct component of the measurement voltage constituting a result of the measurement of the surface potential of the portion of material;

while the variations in the instant height of the detection tip are being detected:
the two control electrodes of the second piezoelectric actuator are electrically connected to two respective reference terminals; and
a control voltage is applied between the two control electrodes of the second piezoelectric actuator using the two reference terminals, said control voltage having a zero amplitude alternating component for the angular frequency of excitation;

compensating for a contribution to an electrical detection signal for the component of the variations in the instant height of the detection tip for the angular frequency of excitation while said variations in the instant height of the detection tip are being detected, said contribution resulting from a direct coupling between the measurement voltage applied between the detection tip and the portion of material, and a detector used to detect the variations in the instant height of the detection tip; and prior measurements of the contribution of the direct coupling to an electrical signal for detecting the variations in the instant height of the detection tip, for angular frequencies different from the angular frequency of excitation, wherein said contribution of the direct coupling to the component of the variations in the instant height of the detection tip for the angular frequency of excitation is compensated for by an extrapolation, at said angular frequency of excitation, of results from the prior measurements for angular frequencies different from the angular frequency of excitation.

2. A method according to claim 1, wherein the control voltage is constantly zero while the variations in the instant height of the detection tip are being detected.

3. A method according to claim 1, implemented using an atomic force microscope.

4. A method according to claim 1, wherein values of the surface potential are measured at successive times during a relative displacement of the detection tip with respect to the surface of the portion of material, parallel to said surface of the portion of material, so as to obtain a map of the surface potential of said portion of material.

5. A method according claim 1, wherein values of the surface potential are measured at successive times during a relative displacement of the detection tip with respect to the surface of the portion of material, perpendicularly to said surface of the portion of material, so as to measure variations in the surface potential of said portion of material as a function of the mean distance between said detection tip and said surface of the portion of material.

6. A device for measuring a surface potential of a material, comprising:

an electrically conductive detection tip configured to be placed above a surface of the portion of material;

a first piezoelectric actuator arranged to control a mean distance between the detection tip and the surface of the portion of material;

a second piezoelectric actuator provided with first and second control electrodes and arranged to control a mechanical oscillation of the detection tip above the surface of the portion of material as a function of a voltage between the first and second control electrodes of said second piezoelectric actuator;

an electrical generator adapted to apply a measurement voltage between the detection tip and the portion of material, said measurement voltage comprising a direct component and an alternating component having an angular frequency of excitation;

a detector configured to detect variations in an instant height of the detection tip;

first and second reference terminals;

a switching module configured to selectively electrically connect the first and second reference terminals to the first and second control electrodes, respectively; and a controller configured to:

measure an amplitude of a component of said variations in the instant height of the detection tip at said angular frequency of excitation;

adjust a value of the direct component of the measurement voltage in a manner that reduces or cancels the amplitude of the component of the variations in the instant height of the detection tip for the angular frequency of excitation, the adjusted value of said direct component of the measurement voltage constituting a result of the measurement of the surface potential of the portion of material; and control the switching module while the detector is activated, in a manner that causes the switching module to electrically connect the first and second control electrodes of the second piezoelectric actuator to the first and second reference terminals, respectively, and to simultaneously have a control voltage produced at said reference terminals, said control voltage having a zero amplitude alternating component for the angular frequency of excitation.

7. A device according to claim 6, additionally comprising a compensator configured to compensate for a contribution to an electrical detection signal for the component of the variations in the instant height of the detection tip for the angular frequency of excitation, the controller additionally being adapted to activate said compensator while the detector is activated.

8. A device according to claim 6, wherein the controller is adapted to cause the control voltage applied to the control electrodes of second piezoelectric actuator to be constantly zero while the detector is activated.

9. A device according to claim 6, comprising an atomic force microscope.

10. A device according to claim 9, wherein the controller is configured to cause the switching module to electrically connect the control electrodes of the second piezoelectric actuator to the reference terminals when the generator is activated, and to cause the switching module to electrically isolate said control electrodes of the second piezoelectric actuator from said reference terminals when a topographic characterization mode is selected for the device.

11. A device according to claim 10, wherein the switching module is external to the atomic force microscope.

* * * * *